United States Patent Office.

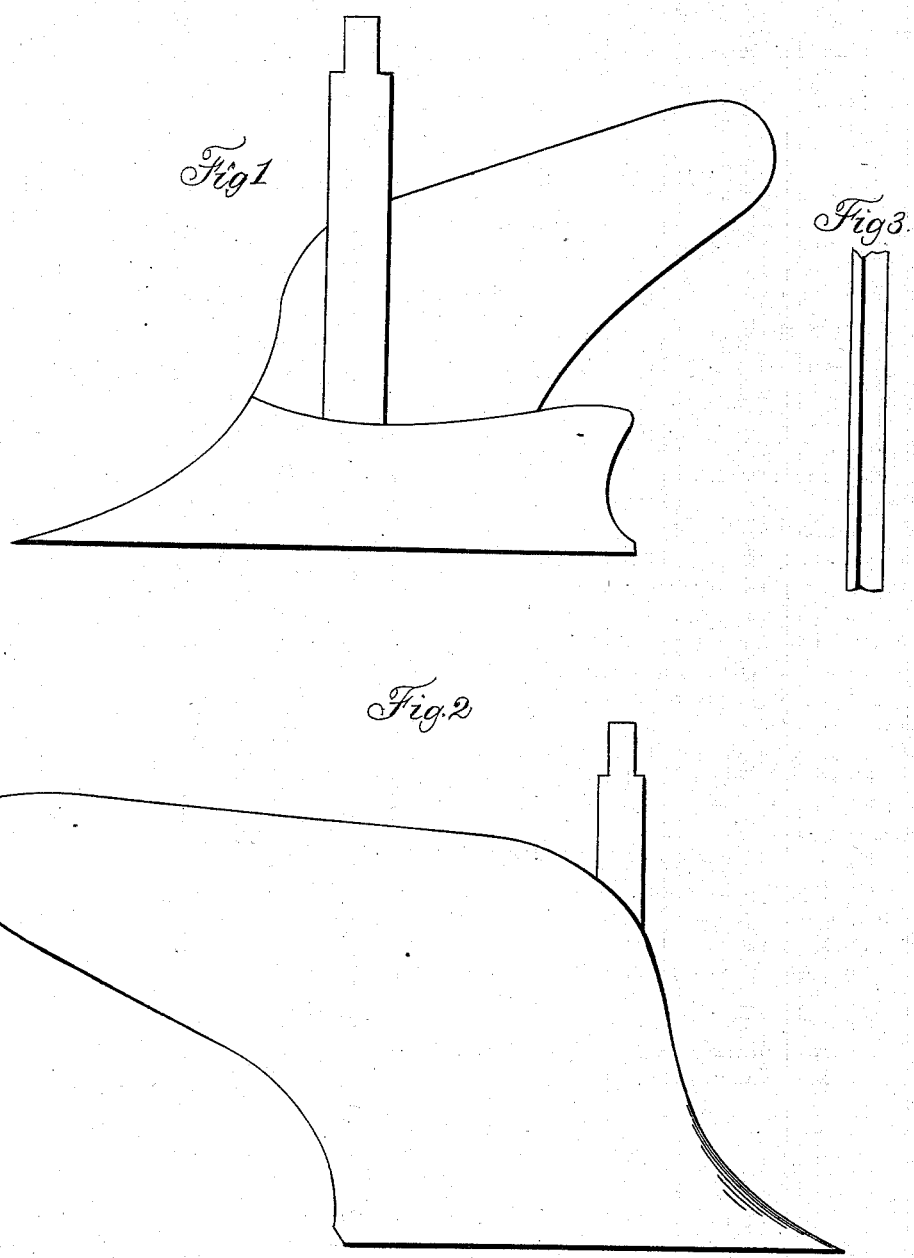

IMPROVEMENT IN PLOUGHS.

CARLOS GLIDDEN, OF MILWAUKEE, WISCONSIN.

Letters Patent No. 60,172, dated December 4, 1866.

SPECIFICATION.

TO ALL WHOM IT MAY CONCERN:

Be it known that I, CARLOS GLIDDEN, of the city of Milwaukee, in the State of Wisconsin, have invented a certain new and useful Improvement on Ploughs, and other ground-preparing or cultivating and planting implements; and I do hereby declare that the following is a full, clear, and exact description of the same, reference being had to the accompanying drawings, and to the letters and marks thereon.

My invention consists in coating or covering such metal portions of ploughs and other implements, as in use come into contact with the earth or soil, with enamel or porcelain; any of the known processes or means, or any of the known enamelling or silicated or silicious compositions being used in carrying out my invention. In addition to the protection from rust which the enamelling will give to such surfaces of metal as may be exposed to moisture or atmospheric influences, friction will be lessened in the passage of the implement through the soil, and the adhesion of clayey and other tenacious soils prevented. If the harder enamellings be used, the durability of the plough or implement will be increased, and thus in the end my improvement will prove to be economical, while the labor will be lessened.

The drawings forming part of this specification show my invention applied to the mould-board and land-side of a plough—

Figure 1 thereof showing the interior surface of the mould-board and the exterior surface of the land-side.

Figure 2 showing the exterior surface of the mould-board; and

Figure 3, by a cross-sectional view, showing a portion of the mould-board, the metal in deep color, and the enamelled portion in light color.

What I claim as my invention, and desire to secure by Letters Patent, is—

Coating or covering with porcelain or silicious enamellings, substantially as herein set forth, such portions of the metal surfaces of ploughs and other ground-preparing or cultivating and planting implements, as come in contact with the earth.

This specification signed this 3d day of July, 1865.

CARLOS GLIDDEN.

Witnesses:
A. G. WALDO,
E. G. CALLAHAN.